May 6, 1958     R. C. SHOEMAKER     2,833,429
MOBILE CANE LOADER APPARATUS
Filed Jan. 7, 1955     2 Sheets-Sheet 1
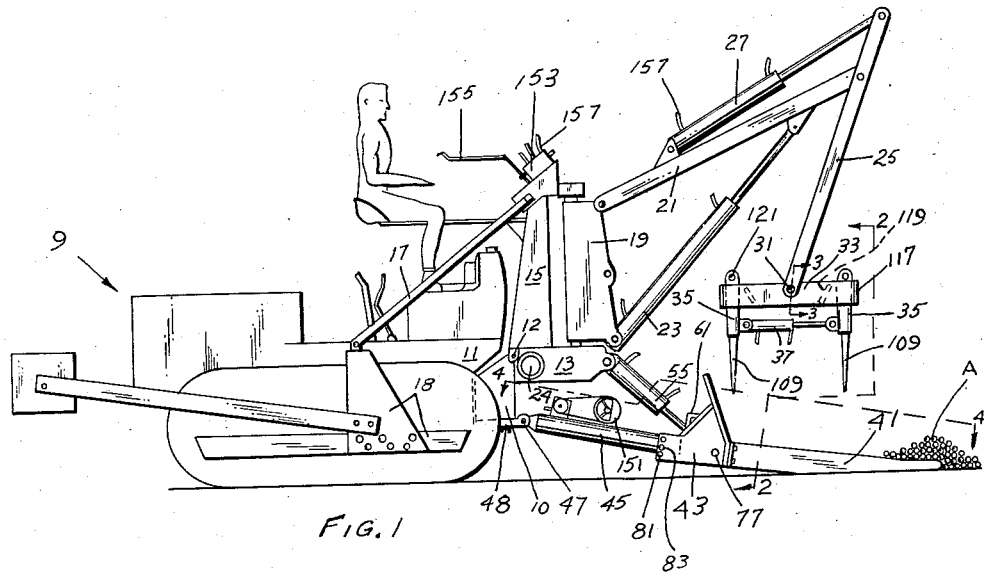
FIG. 1
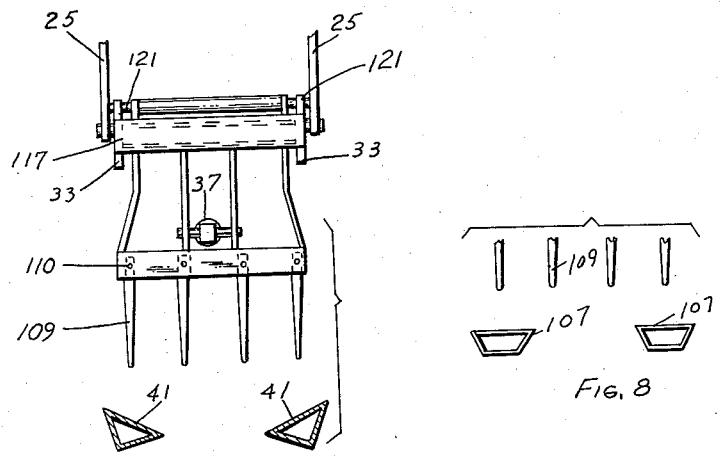
FIG. 2
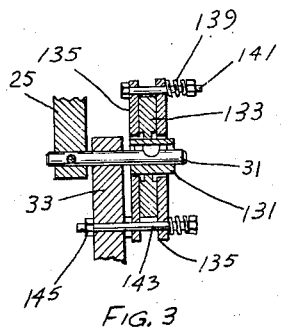
FIG. 3
FIG. 8
ROBERT C. SHOEMAKER
INVENTOR.
BY Buckhorn + Cheatham May 6, 1958 R. C. SHOEMAKER 2,833,429
MOBILE CANE LOADER APPARATUS
Filed Jan. 7, 1955 2 Sheets-Sheet 2

ROBERT C. SHOEMAKER
INVENTOR.

BY Buckhorn + Cheatham

United States Patent Office 2,833,429
Patented May 6, 1958

2,833,429

MOBILE CANE LOADER APPARATUS

Robert C. Shoemaker, Portland, Oreg., assignor to Hyster Company, Portland, Oreg., a corporation of Oregon Application January 7, 1955, Serial No. 480,455

17 Claims. (Cl. 214—86)

This invention relates to loading apparatus and particularly to apparatus for loading cut cane in the field.

Most prior cut cane loading apparatus operate on the principle of picking up cut cane directly from the ground. One conventional type of machine pushes cut cane along the ground into a pile primarily resting on the ground and then picks up the piled-up cane with a grapple. Considerable dirt is mixed with the cane during the piling operation and the grapple digs into the soil when picking up the piled cane to mix additional quantities of dirt with the cane. Dirt in cane materially increases milling cost and must be avoided as far as possible.

A main object of the present invention is to provide a cane loading apparatus operable to pick up cut cane in the field in a manner such that considerably less dirt is intermixed with the cane than is intermixed by prior machines.

A more particular object of the present invention is to provide a cane loading apparatus operable to gather or collect cut cane while slightly lifting it off the ground in a manner resulting in little intermixing of dirt, and then operable to pick up the collected cut cane without contact of the pickup device with the ground.

Another object of the present invention is to provide a cane loading apparatus which is operable to effect considerable separation from the cut cane of the small amount of dirt that happens to be intermixed with the cut cane during the gathering operation.

Another object of the present invention is to provide a cane loading apparatus of the type including a pendulous cane pick-up grapple, wherein movement of the grapple is so dampened as to facilitate ready spotting of the grapple relative to the cane to be picked up.

A further object of the present invention is to provide a cane loader attachment which may be readily connected to a conventional vehicle.

The apparatus of the present invention is characterized by including a fork including a pair of ground engaging fork arms adapted for attachment to a vehicle and adapted upon forward travel of the vehicle to slide under cut cane and slightly elevate it off the ground. Cooperable with the fork arms is a boom-supported grapple carried by the vehicle, the tines of each jaw of the grapple being so closely spaced that when the grapple is lowered to pick up cane from the fork arms, certain of the tines of the grapple will abuttingly engage the fork arms in a manner preventing the tines from coming into contact with the ground. The grapple is so designed that it may be closed after being brought into engagement with the fork arms, even though the grapple is held by its supporting mechanism bodily stationary relative to the fork arms.

Various other objects of the present invention will be apparent from the following description taken in connection with the accompanying drawings wherein:

Fig. 1 is a somewhat schematic side elevational view of a cane loading apparatus of the present invention;

Fig. 2 is a somewhat enlarged sectional view taken along line 2—2 of Fig. 1;

Fig. 3 is a sectional view taken along line 3—3 of Fig. 1, showing the grapple snubber;

Fig. 8 is a view generally similar to Fig. 2 but showing a modified form of the invention;

Figure 4:
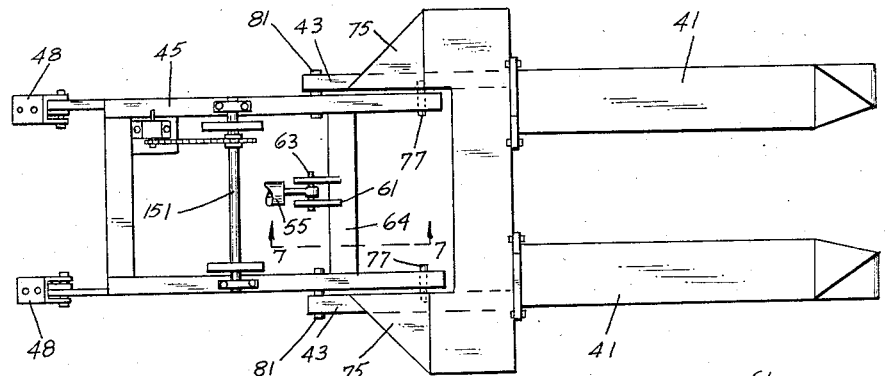
Fig. 4 is a somewhat enlarged sectional view taken along line 4—4 of Fig. 1.
Figure 7:
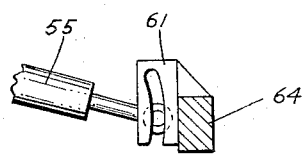
Fig. 7 is a somewhat enlarged sectional view taken along line 7—7 of Fig. 4.

Referring to Fig. 1 of the accompanying drawings, the cane loader disclosed includes a conventional crawler tractor 9, on the rear end of which is mounted a cane loader attachment of the present invention.

It is here pointed out that during operation of the cane loader, the tractor moves from left to right as parts are shown in Fig. 1 to shove the forks beneath cut cane on the ground. Thus, actually the tractor is moving rearwardly when considered relative to its front and rear ends, but for the purposes of the present invention, the tractor may be considered as moving forwardly when moving from left to right.

The cane loader attachment includes a bracket 10 fixed to the frame 11 of the tractor. A base 13 is pivotally mounted at 12 on bracket 10. Fixedly mounted on the base is a mast 15, which is connected at its upper end by a back-stay device, which includes two back-stays 17, to the two track frames 18 of the tractor. Mounted between base 13 and the upper end of the mast 15 for pivotal movement about a vertical axis is a post 19. The construction of the back-stay device is shown in United States Patent 2,564,929.

A boom 21 is pivoted at its heel end to the upper end of post 19. The boom may be swung vertically by operation of a hydraulic cylinder 23 connecting the boom to the lower end of the post 19, and may be swung horizontally by a hydraulic cylinder mechanism 24 mounted on base 13 and operatively connected to the post 19. The cylinder mechanism includes a pair of opposed in-line cylinders connected to a common rod carrying rack teeth. The rack teeth mesh with a first spur gear mounted within base 13, said gear meshing with a second spur gear having a spline connection with the lower end of post 19.

A pair of cross-braced sticks 25 is pivotally mounted on the free end of the boom, movement of the sticks being controlled by a cylinder 27 pivotally connecting the sticks to the boom. Pivotally suspended at 31 from the free end of the sticks is a grapple including a frame 33 and a pair of jaws 35. A grapple cylinder 37 pivotally connects and controls the movement of the jaws.

The grapple is operated to pick up cut cane from a fork including a pair of fork arms 41, which are fixed at their rear ends to a fork bracket 43 which in turn is adjustably connected to a support frame 45. Frame 45 is pivoted for free pivotal movement about a horizontal axis at 47 to a pair of pivot blocks 48 which are fixed to the underside of bracket 10.

Figure 5:
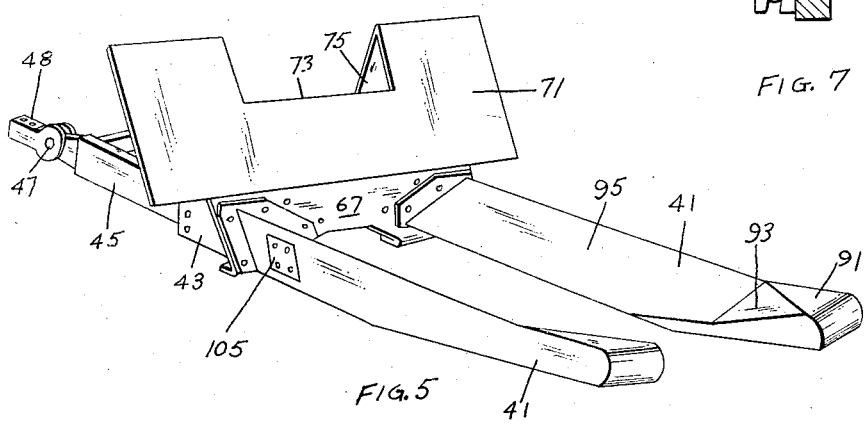
Fig. 5 is a perspective view of the fork assembly.

The fork arms 41 may be raised off the ground for purposes to presently appear by means of a hydraulic cylinder 55 which is connected at one end to base 13 and at its opposite end to the fork frame 45 by means of a lost-motion connection best shown in Figs. 4 and 5. It is apparent that the lost-motion connection includes a pair of spaced pin guides 61 slidably receiving the ends of a pin 63 carried by the lower end of the piston rod of cylinder 55. The pin guides are fixed centrally to a cross-piece 64 of the frame 45 which is shown as being a rigid open rectangular unit.

Figs. 1 and 4 also show that the fork bracket 43 includes a pair of spaced side pieces which have been given the reference numeral 43 and which have upwardly projecting triangular portions supporting a front stop comprising a plate having a bottom front portion 67 (Fig. 5) recessed at 69 centrally of the lower margin thereof, an inclined stop portion 71 which is wider than portion 67 and is centrally recessed at 73 along its upper margin to accommodate the cylinder 23, and rear gusset portions 75 (Fig. 4), all portions being suitably fastened to the side pieces 43. Each of side pieces 43 is pivotally connected at 77 to the front end of frame 45 which fits between the rear ends of side pieces 43, and is connected at each side at its rear end by a bolt 81 to frame 45. Each side piece is provided at its rear end with a vertical row of holes 83 which the associated bolt 81 may selectively fit to permit the angle of attack of the fork arms 41 to be adjusted. The fork arms 41 are hollow and are specially formed so that they may pick up cane with a minimum of dirt, so that they can slip under cane with a minimum amount of cane pile-up in front of the forks, so that they will not dig into the soil when operating in uneven terrain, and so that whatever dirt is picked up may readily gravitate off the forks prior to the cut cane being picked up therefrom by the grapple. Although the form of fork arm shown has been found to fulfill the above conditions, the invention may be carried out by using fork arms having configurations other than that shown, such as shown in Fig. 8, although with less advantageous operating characteristics.

Figure 6:
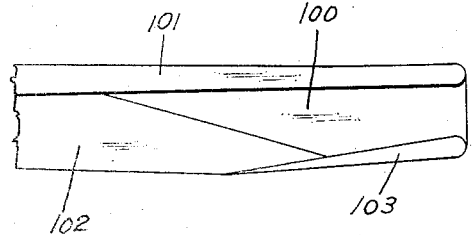
Fig. 6 is a bottom view of the forward portion of a fork arm.

The fork arms are best shown in Fig. 5 and there it is apparent that each fork arm has an inwardly slanting or inclined top surface except only for a small flat horizontal forward portion 91, said inclined top surface including a flat inwardly and rearwardly slanting portion 93 angularly intersecting a flat main inwardly slanting top surface portion 95. The front end of the each fork arm is rounded and thus blunt. The rear portion of each fork is of triangular cross section (Fig. 2). The underside of each fork (Fig. 6) includes a flat horizontal ground engaging surface 100 which, together with the blunt front end of the fork arm, prevents the fork arm from "diving" into the soil, especially when the apparatus is operating on uneven terrain. The underside of each fork arm also includes an outer downwardly and inwardly slanting surface 101 and inner downwardly and outwardly slanting surfaces 102 and 103.

If there is any tendency for the fork arms to ride over cut cane in the field, this can be overcome by filling the hollow fork arms with sand or other ballast through openings closed by plates 105.

Figure 9:
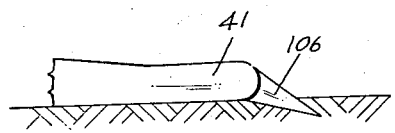
Fig. 9 shows another modified form of the invention.

Fig. 9 shows a modified fork arm having a centrally disposed pickup plate 106, the forward end of which projects below the plane of surface 100 for the purpose of preventing the fork arms from riding over the cane without causing the fork arms to plunge into the ground.

The Fig. 8 fork arms 107 are similar to the forks of Fig. 5, but have flat horizontal top surfaces instead of inwardly inclined top surfaces. Dirt does not fall off the Fig. 8 fork arms as well as it does off the Fig. 5 fork arms.

An important feature of the present invention is disclosed in Figs. 1 and 2. There it is apparent that each of jaws 35 of the grapple has a plurality of tines or teeth 109, four being shown which are spaced from one another by a distance less than the width of a fork arm. Thus, as the grapple is lowered, the teeth or tines cannot straddle and pass by the fork arms and enter the ground, but must come into abutting contact or engagement with such fork arms. Therefore the grapple teeth or tines are positively prevented from coming into engagement with the soil.

The tines 109 are removably held in sockets in the jaws 35 by screws 110. Thus, the tines may be readily replaced.

Figs. 2 and 3 also show in more detail the construction of the grapple and a second very important feature of the present invention, namely the manner in which the tines or teeth move toward one another. The grapple frame includes a pair of spaced side pieces 33 held in fixed spaced relation by a pair of outer stop members 117 and a pair of inner stop members 119. The jaws 35 are pivoted at 121 to and within the frame 33 for movement back and forth between the stop members. The spacing of the pivots 121 and the arrangement of the outer stop members 117 is such that the extremities of the teeth fall vertically under the associated pivots when the jaws are in their outermost positions. This means that when the jaws are swung together, the extremities of the teeth move along paths curving upwardly from low points at the outer positions of the jaws. Thus, the grapple may be held, and in fact is held, in positive engagement with the fork arms with the jaws open and the jaws may be closed without creating an upward component of force tending to cam the grapple away from the fork arms.

It is distinctly pointed out here that the particular manner of mounting the jaws of the grapple for the above movement is not intended to be limiting on the invention, and the jaws may be mounted in other ways to obtain the desired movement, namely a movement of the jaws along paths such that the lower ends of the tines or teeth do not move below a straight line connecting the ends of the tines when the jaws are fully open. For instance, the tines may be mounted for inward straight line movement if desired, although such an arrangement is more expensive than that shown.

A dampening device is provided for the grapple and is best shown in Fig. 3. The dampening device includes a hub 131 fixed to the pivot pin 31 which in turn is fixed to the associated stick 25. Fixed to hub 131 is a friction disk 133 which is arranged between a pair of pressure plates 135. The friction disk is clamped between the pressure plates by springs 139 mounted on bolts 141 extending through the plates. One of the bolts has a portion 143 extending through the associated side piece 33 of the grapple frame and fixed to the grapple frame by a nut 145. Thus, the friction disk is in effect fixed to a stick, whereas the friction plates are fixed to the grapple frame. Thus the device dampens movement of the grapple relative to the sticks 25.

A hydraulic circuit is provided on the apparatus for supplying hydraulic fluid to the various cylinders and to a hydraulic vibrator 151 mounted on frame 45, and to relieve hydraulic fluid from such parts. This hydraulic circuit includes a multiple valve unit at 153 mounted on the upper end of mast 15 and controlled by the handles 155. The multiple valve unit is connected by suitable hose 157 to the above named parts. The multiple valve unit is of conventional construction, and thus need not be described in detail.

The valves of the multiple valve unit may be of the spool type and operable when the spool is shifted in one direction to supply fluid to one end of a cylinder and to relieve fluid from the opposite end of the cylinder. In the neutral position, the spool simply blocks the conduits to the cylinder to hold the member operated by the cylinder in a fixed position.

The operation of the device is as follows. The tractor is driven forwardly, that is from left to right as the parts are depicted in Fig. 1, to shove the fork arms 41 beneath cut cane A, which during cutting is thrown on the ground in windrows parallel to the furrows. The operator of the tractor maneuvers the tractor so that the crawler units and the fork arms straddle a row where cane has grown. The recess at 69 accommodates the row and assures that the roots of the cane which has been cut will not be harmed.

During such forward travel of the tractor, a small amount of cane will pile up in front of the blunt forward ends of fork arms 41 but most of the cane will not be pushed along the ground but will merely slide onto the fork arms and be shoved by subsequently collected cane up the slightly inclined fork arms.

The vibrator 151 will be in operation to cause dirt to fall free from the collected cane. This falling dirt, as well as other dirt which is carried onto the fork arms by the cut cane, will not be retained on the fork arms, but will be caused to gravitate down the inwardly inclined upper surfaces 93 and 95 of the fork arms. Thus, a dirt separation takes place.

After a sufficient quantity of cane has collected on the fork arms, the operator swings the open grapple downwardly to bring the tines into abutting engagement with the upper surfaces of the fork arms, in a position embracing a substantial quantity of collected cane. During such swinging movement of the grapple, the dampening device of Fig. 3 functions to retard swinging movement of the grapple so that it may be readily spotted relative to the collected cane and lowered into the collected cane with the jaws properly maintained in depending relation for insertion into and collection of cane. This considerably speeds up operation of the apparatus. Because of the hydraulic cylinders, the tines can be positively shoved through the collected cane.

The operator now causes the jaws 35 to close, the ends of the tines of the jaws moving together along slightly ascending paths so that there is no tendency for the jaws to bindingly engage the fork arms. The operator now causes the grapple to swing upwardly and outwardly to deposit the picked-up cane into a suitable receptacle, such as, for instance, a wagon, cart, trailer, truck or the like.

The above operations are continued to pick up additional cane along the row. At the end of the row, cylinder 55 is operated to elevate the fork arms to permit the tractor to turn for travel down an adjoining row. It will be understood that the lost motion connection at 61 normally permits the fork arms freely to pivot relative to the tractor as required by the contour of the terrain, and it is only when the lost motion is taken up by operation of cylinder 55 that the fork arms are supported off the ground.

It is pointed out that the cylinder 55 may be operated to lift the fork arms 41 off the ground just prior to the time that the grapple picks up cane from the fork arms. The effect of vibrator 151 is more pronounced under these circumstances.

It is further pointed out that the blunt ends of the fork arms 41 and the flat lower ground engaging surfaces 100 of the fork arms function to prevent the fork arms from diving into the ground during operation of the apparatus. Also, the entire under surfaces of the fork arms will assist in preventing such a diving action of the fork arms.

Although the cane loader attachment of the present invention is shown as being mounted on a crawler tractor, it could obviously be mounted on other apparatus and mobile vehicles. Also, although the cane loading apparatus of the present invention is particularly adapted for loading cut cane, it could be used for loading other materials on the ground.

Having described the invention in what is considered to be the preferred embodiment thereof, it is desired that it be understood that the invention is not to be limited by the specific details shown unless they constitute critical features of the present invention, all of which will be apparent by reference to the following claims.

I claim:

1. A cane loading apparatus comprising a mobile vehicle having a generally horizontal ground engaging member at one end adapted to slip beneath cane on the ground upon forward travel of the vehicle to lift the cane off the ground, a grapple, means mounting the grapple on the vehicle operable to bring the grapple into abutting engagement with said ground engaging member to pick up cane therefrom without engaging the ground.

2. A cane loader comprising a ground-engaging support upon which cane to be loaded is accumulated above the ground, a grapple having cane pickup elements, means for moving the grapple toward the support for picking up cane, the tines of the grapple being spaced apart by distances less than the effective width of the support so that at least certain of said tines will abut against said support when the grapple is lowered and prevent said tines from engaging the ground.

3. A cane loader attachment for a vehicle comprising a fork including a pair of ground engaging fork arms, means for mounting the fork arms on the forward end of a vehicle in a position extending longitudinally of the vehicle so that the fork arms may be shoved along the ground and under cut cane on the ground, a grapple having movable jaws, grapple-mounting means for supporting the grapple on the vehicle, said means being operable to bring said grapple over said fork arms in a position such that the grapple jaws move along paths contained in a vertical plane parallel to the lengths of the fork arms, said fork arms having a length greater than the maximum distance between the jaws when the jaws are fully opened, said means supporting said grapple when in the above mentioned position entirely within the longitudinal confines of the fork arms.

4. A cane loading apparatus comprising a cane gathering assembly, means for mounting the assembly on the front end of a vehicle to permit said assembly to gather cane upon forward movement of said vehicle, a grapple having cane grabbing jaws, means for mounting the grapple on the vehicle for movement to and from a position to pick up cane gathered by said cane gathering assembly, means for opening and closing said jaws, said gathering assembly including forwardly extending fork arms, said fork arms being disposed at substantially the same level, said cane-gathering assembly including means for limiting travel of cane along the fork arms to cause the cane to pile up on the fork arms, the last-mentioned means comprising an upright stop member at the rear ends of said fork arms, the extension of at least some of said fork arms forwardly of said stop member being greater than the maximum distance between the open jaws of the grapple, whereby upon forward movement of said vehicle the fork arms may be shoved under cut cane on the ground to cause the cut cane to be shoved along said fork arms for substantially the full length thereof to thus collect or gather cane upon said fork arms to permit the cane to be picked up therefrom by the grapple operating within the longitudinal confines of the fork arms.

5. A cane loading apparatus comprising a fork having fork arms, means for mounting said fork on the front end of a vehicle for floating movement relative to the vehicle and in a position resting on the ground and extending forwardly of the vehicle whereby upon forward movement of said vehicle said fork is shoved under cut cane on the ground to gather the cane and lift it off the ground, a grapple, means for mounting said grapple on said vehicle for movement to a position to pick up gathered cane from said fork, and means for opening and closing said grapple, the arms of said fork being so laterally spaced relative to certain portions of said grapple that said certain portions of said grapple will abuttingly engage said arms when said grapple is lowered to pick up cane, to thereby prevent said grapple from digging into the ground.

6. A cane loading apparatus comprising a fork having fork arms, means for mounting said fork on the front end of a vehicle in a position extending forwardly of the vehicle whereby upon forward movement of said vehicle said fork is shoved under cut cane on the ground to gather the cane and lift it off the ground, a grapple having two sets of relatively movable tines for grabbing cane, means for mounting said grapple on said vehicle for movement to a position to pick up gathered cane from said fork, said grapple when in said position being supported so that the tines are movable along paths generally longitudinally of said vehicle, the tines of each set being laterally spaced apart by distances less than the width of a fork arm, the outermost tines of each set being spaced apart by a distance greater than the distance between the inner edges of the said fork arms, whereby when said tines are lowered to pick up cane from the fork, the end portions of at least certain of said tines will abuttingly engage said fork arms to positively limit downward movement of the tines relative to the fork.

7. A cane loader apparatus comprising a grapple, means for supporting said grapple on a vehicle for movement to and from a position adjacent the ground for picking up cut cane, the grapple supporting means pivotally supporting said grapple, means for opening and closing said grapple, and self-operating dampening means between the grapple and said grapple supporting means operable to retard swinging movement of the grapple relative to said grapple supporting means.

8. A cane loader apparatus comprising a fork, means for mounting said fork on the front end of a vehicle in a position extending forwardly whereby upon forward movement of said vehicle said fork is shoved under cut cane on the ground to gather the cane and lift it off the ground, a grapple including a pair of jaws and jaw mounting means for supporting said jaws, means for supporting said grapple on said vehicle for movement to a position adjacent the fork for picking up cut cane therefrom, and means for opening and closing said jaws, said jaw mounting means so supporting the jaws for movement relative to one another that the free ends of the jaws are constrained to move along paths which do not extend below a straight line connecting the free ends of said jaws when said jaws are fully open, the arms of said fork being so laterally spaced relative to certain portions of said jaws that said certain portions will abuttingly engage said arms when said grapple is lowered.

9. A cane loader apparatus comprising a fork, means for mounting said fork on the front end of a vehicle in a position extending forwardly whereby upon forward movement of said vehicle said fork is shoved under cut cane on the ground to gather the cane and lift it off the ground, a grapple including jaw mounting means and a pair of jaws supported by the mounting means, means for supporting said grapple on said vehicle for movement to a position to pick up cut cane from the fork, and means for opening and closing said jaws, each jaw including a set of tines, said jaw mounting means so supporting said jaws for movement relative to one another that the free ends of said tines are constrained to move along paths which do not extend below a straight line connecting the free ends of said jaws when the jaws are fully open, the tines of each jaw being laterally spaced apart by distances less than the width of a fork arm, the outermost tines of each set being spaced apart by a distance greater than the distance between the inner edges of the fork arms, whereby when said grapple is lowered to pick up cane from the fork at least certain of said tines will abuttingly engage the fork arms to positively limit downward movement of the tines relative to the fork.

10. A cane loading apparatus comprising a plurality of generally parallel ground engaging members, means for mounting said ground engaging members on one end of a vehicle in positions resting on the ground and extending forwardly of the vehicle whereby upon movement of said vehicle in one direction said ground engaging members are shoved under cut cane on the ground to gather the cane and lift it off the ground, a grapple, means for mounting said grapple on said vehicle for movement to a position to pick up gathered cane from said ground engaging member, and means for opening and closing said grapple, said ground engaging member having transversely slanted upper surfaces.

11. A cane loading apparatus comprising a plurality of generally parallel ground engaging members, means for floatingly mounting said ground engaging members on the front end of a vehicle in positions extending forwardly of the vehicle whereby upon forward movement of said vehicle said ground engaging members are shoved under cut cane on the ground to gather the cane and lift it off the ground, a cane pickup device, means for mounting said device on said vehicle for movement to a position to pick up gathered cane from said ground engaging members, means for opening and closing said device, at least some of the ground engaging members being hollow, at least certain of the hollow ground engaging members having openings formed therein by which they may be filled with ballast, and removable means closing said openings.

12. A cane loading apparatus comprising ground engaging cane gathering means, means for mounting said gathering means on one end of a vehicle, said cane gathering means being operable upon movement of the vehicle in one direction to gather cane, cane pickup means, means for mounting the cane pickup means on the vehicle for movement to and from a position to pick up cane from the gathering means, and vibrator means operatively connected to the gathering means and operable to vibrate the same and facilitate separation of foreign material such as dirt, rocks and the like from gathered cane.

13. A cut cane gathering apparatus comprising at least one fork arm, means for mounting the arm in a forwardly projecting position on the front of a vehicle with at least the front portion of the arm resting on the ground, the front end of the arm being of semi-cylindrical configuration with a radius not less than the diameter of the cut cane to be gathered.

14. A cane handling apparatus comprising a cane support upon which cane may rest, a cane pickup device, and means for moving said cane pickup device into abutting engagement with the cane support to pick up cane therefrom.

15. A cane handling apparatus including a ground engaging cane gathering member, means for mounting the cane gathering member on the front end of a vehicle, said cane gathering member being operable upon forward movement to be shoved under cut cane on the ground, and a downwardly and forwardly extending tooth at the forward end of said member operable upon forward movement of said vehicle to facilitate movement of the cane on the ground onto said member, said tooth having a width substantially less than that of the cane gathering member.

16. A loading apparatus for loading loose, elongated material on the ground comprising a fork having fork arms, means for mounting said fork on the front end of a vehicle for floating movement relative to the vehicle and in a position resting on the ground and extending forwardly of the vehicle whereby upon forward movement of said vehicle said fork is shoved under loose material on the ground to gather the material and lift it off the ground, a grapple, means for mounting said grapple for movement to a position to pick up gathered material from said fork, and means for opening and closing said grapple, the arms of said fork being so laterally spaced relative to certain portions of said grapple that said certain portions of said grapple will abuttingly engage said arms when said grapple is lowered to pick up loose material, to thereby prevent said grapple from digging into the ground.

17. A loader for loading loose, elongated material on the ground comprising a ground-engaging support upon which loose material to be loaded is accumulated above the ground, a grapple having cane pick up elements, means for moving the grapple toward the support for picking up loose material, the tines of the grapple being spaced apart by distances less than the effective width of the support so that at least certain of said tines will abut against said support when the grapple is lowered and prevent said tines from engaging the ground.

(References on following page)

References Cited in the file of this patent

UNITED STATES PATENTS

| | | |
|---|---|---|
| 2,375,205 | Barras | May 8, 1945 |
| 2,599,677 | Waguespack | June 10, 1952 |
| 2,639,048 | Glashaw | May 19, 1953 |
| 2,674,380 | Boudreaux | Apr. 6, 1954 |
| 2,702,137 | Ives | Feb. 15, 1955 |
| 2,717,704 | Pilch | Sept. 13, 1955 |

FOREIGN PATENTS

| | | |
|---|---|---|
| 1,029,479 | France | June 3, 1953 |